Oct. 16, 1951  K. E. BERGSTRÖM  2,571,659
CLAMP
Filed Jan. 31, 1945

INVENTOR
KNUT EDWIN BERGSTRÖM

BY *Wenderoth, Lind & Ponack*
ATTORNEYS

Patented Oct. 16, 1951

2,571,659

UNITED STATES PATENT OFFICE 2,571,659

CLAMP

Knut Edwin Bergström, Stockholm, Sweden

Application January 31, 1945, Serial No. 575,423
In Sweden May 22, 1942

Section 1, Public Law 690, August 8, 1946
Patent expires May 22, 1962

2 Claims. (Cl. 24—19)

My present invention relates to improvements in pipe or hose clips or clamps of the type in which the ends of a relatively thin metal strip surrounding the pipe or hose are displaced relatively to one another by means of a worm engaging a screw thread on one end of the strip, so that the clamp may be tightened around the hose by turning the worm in one direction, or loosened by turning the worm in the opposite direction.

In clamps of this kind the ends of the metal strip overlap each other, the outermost end of the overlapping portions of the strip being provided with screw threads, or oblique grooves, for engagement with the worm, whilst the innermost end of the strip is connected with a tubular bearing case for the worm.

The construction of such known hose or pipe clamps or clips as hitherto used are not wholly reliable mainly on account of two reasons, which will be realized by those skilled in the art when considering that the metal strip used must be relatively thin for enabling it to be tightened around the hose or pipe, and that the tensional stress consequential to the tightening can easily assume a very considerable order of magnitude and may exceed the strength of the strip and thereby cause a rupture of the clamp. Furthermore, hose or pipe clamps of this type are used to a great extent in aircraft, for instance, wherein they are subjected to continuous vibrations for rather long periods, and in such cases the clamps must be effective and reliable, if they are to be serviceable.

The aforementioned two reasons for the unreliability of the known constructions are firstly, that the connection between the innermost end of the metal strip and the worm-bearing case at the lap is unreliable owing to the dimensions of the strip, which will not permit it to offer such a contact surface to the surrounding worm-bearing case as will be adequate to withstand the maximum stress that such a surface must in practice be expected to take up, and secondly, the bearing case, in the types of similar clamps hitherto known, is bent into tubular shape from a flat metal sheet in such a manner that it will exhibit a longitudinal slit facing towards the interior of such a clamp, thereby endangering the reliability of the bearing case in transverse direction due to radial stresses caused by the worm when tightening the clamp.

The object of the invention is to eliminate these disadvantages inherent in the similar hose clamp constructions hitherto known, and the means for securing this object will be clearly understood from the following.

A preferable embodiment of the invention is illustrated in the accompanying drawing in which.

Figure 1:
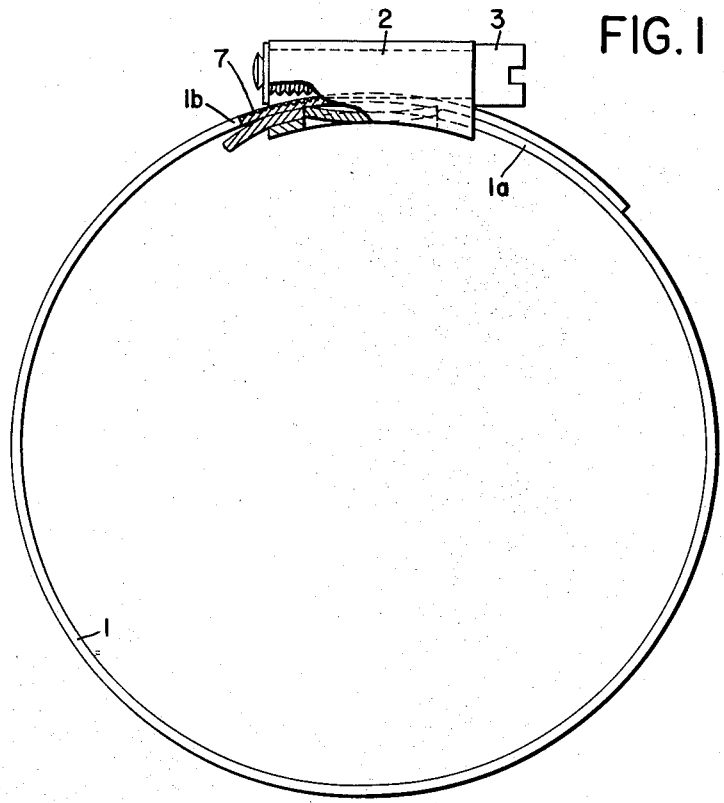
Fig. 1 shows an axial view of the clamp or clip, partly in section.

In the drawing, the reference numeral I generally designates the metal strip, the innermost end of which at the lap being designated $I^a$ whilst the outermost end of the strip has been given the reference $I^b$. The reference numeral 2 is the tubular bearing case for the worm or screw 3, which is journaled in the case in such a manner that it will not be axially displaceable therein, and this worm or screw, is positioned in engagement with thread grooves 7 in the outer face of the strip end $I^b$ at the lap. This is common in the art and need not be described in detail, but it is apparent that a turning of the worm in one direction will diminish the diameter of the strip I, so that it may be tightened around the hose or pipe, or loosened by turning the worm in the opposite direction.

It might be observed that it is perhaps not quite correct to speak of "pipes" in this connection, but it must be borne in mind that pipes may also consist of compressible material, for instance lead pipes or the like, and the circumferential stress arising when using clamps of this type is so great that they may be used even on lead pipes (due to the flowing of the material) as well as on hoses made from textile material or more or less reinforced rubber. This observation may perhaps throw some light on the circumstances encountered in practice when using clamps according to the type in question, and to the actual stresses which may arise in practice. It is obvious then that the clamp shall be simple and light, but that it must at the same time be able to withstand even those stresses consequential to the use of a worm or a screw.

Now, with reference to the present invention, it must be borne in mind that the stresses are divided above all in a peripheral tensional stress arising in the metal strip I, and secondly in a transverse or radial stress arising in the bearing case 2. Both of these stresses must be adequately withstood or taken up if the clamp or clip is to be entirely reliable under all circumstances.

In the known constructions, the bearing case 2 adapted to be connected to the innermost end 1ª of the metal strip 1 at the lap is provided with one or more indented warts or flaps which are unsatisfactory inasmuch as they do not present an adequate surface to the corresponding aperture in the strip end, and because they may rather easily be flattened when subjected to the peripheral forces due to the stress in the strip.

Figure 2:
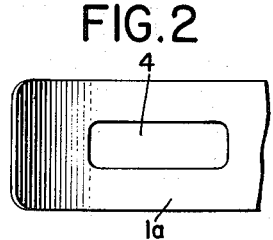
Fig. 2 is a plan view of the innermost end of the clamp strip at the lap.
Figure 3:
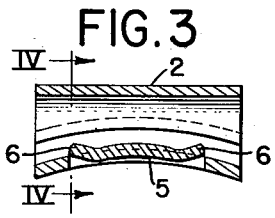
Fig. 3 shows a longitudinal section of the bearing case for the worm, the bearings themselves being omitted.
Figure 4:
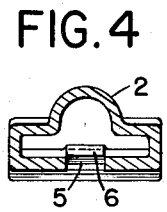
Fig. 4 is a central transverse section of said case along the line IV—IV of Fig. 3.
Figure 5:
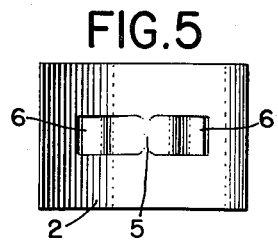
Fig. 5 shows a plan view of the same seen from the inner side of the clamp.

In order to mitigate or eliminate this unreliability, the bearing case 2 according to the invention is provided at its inner wall with an inwardly projecting ridge 5 or the like, extending peripherally to a sufficient degree. Such a ridge is preferably performed by press action on the material of the case, and moreover the pressing tool may be constructed in such a way that the ends of such a ridge or the like, are cut loose from the sheet material from which the case 2 is formed, so that both ends of the ridge form indented or inwardly protruding ends 6, as will be apparent from Fig. 3 when compared with Fig. 4. An oblong aperture 4 provided in the strip end 1ª (see Fig. 2) is intended to surround, or enclose, the said ridge 5, and its freely cut ends 6. When constructing the securing means in this way and presuming that the ends 6 project into the case 2 to an amount substantially equivalent to the thickness of the strip 1, or perhaps a little more, it will be apparent that the tensional stress in the strip will tend to bend the ends 6 still further inwardly into the casing 2 instead of pressing them out. Hence, the strip 1ª will be effectively affixed to the casing 2, as long as the strip end 1ᵇ is in place, but the last mentioned strip end, by turning of the worm 3, may be entirely withdrawn from the bearing case 2, whereafter the strip end 1ª may also be removed from the said case (since it has no thread grooves), so that the clamp as a whole may be removed from the hose or pipe. Similarly, it is also easy to mount the clamp on a hose or pipe, if it cannot be threaded thereon from a free end thereof. The remaining fixed connection faces between the ridge 5 and the innermost portion of the case 2 might always be made sufficient, in spite of the freely cut ends of the ridge, and the width of the strip 1 may always be chosen so that no breakage thereof is to be feared in spite of the aperture 4.

Secondly, one cannot properly produce an impressed ridge 5 of the kind described unless the tubular shape of the bearing case 2 is continuous or unbroken, in transverse direction, and forms no longitudinal slit or the like, as in previously known clamp constructions of similar kind. Naturally it is open to choose such a thick and stiff material for the bearing sleeve 2 that the risk for radial expansion will be negligible or reduced to a minimum, but nevertheless this risk cannot be eliminated unless the circumference of the case is continuous or unbroken. Besides this, such a choice of material would either increase the cost of the whole or make the clamp bulky and cumbersome. As an example it might be said that stainless steel (or perhaps Duralumin) is the perfect material both for the strip 1 and the bearing case 2, but the material used for the worm or screw 3 is of minor importance. Both of the said materials, for the constructional parts in question, are both light and strong, and they do not corrode.

What I claim and desire to secure by Letters Patent is:

1. A hose clamp comprising a substantially annular metal strip with overlapping ends, a tubular bearing sleeve surrounding the overlapping ends of said annular metal strip, a worm rotatably mounted in said sleeve, the overlapping portion of said annular metal strip having threaded means thereon for engagement with said worm, the overlapped portion of said annular metal strip having an elongated oblong slot therein, said sleeve consisting of a single seamless piece of metal, an elongated struck up ridge in the bottom part of said sleeve of substantially equal dimensions with said slot and of corresponding shape therewith, said struck up ridge having the terminal ends thereof severed and being bent inwardly towards the overlapping ends of said annular metal strip, said severed ends projecting into said sleeve a distance substantially equivalent to the thickness of said annular metal strip, said ridge having said severed ends being inserted in said slot in said strip and said severed ends being in abutment with the transverse ends of said slot, said severed ends being adapted upon tightening of said hose clamp to extend further into said sleeve and press the threaded portion of said strip into tighter engagement with said worm.

2. A hose clamp as claimed in claim 1 and wherein the longitudinal sides of said struck up ridge are severed inwardly from said severed terminal ends a short distance and the remainder of said ridge being integral with the single seamless sleeve.

KNUT EDWIN BERGSTRÖM.

REFERENCES CITED

The following references are of record in the file of this patent:

UNITED STATES PATENTS

| Number | Name | Date |
|---|---|---|
| 161,409 | Hardman | Mar. 30, 1875 |
| 237,039 | Miller | Jan. 25, 1881 |
| 1,176,181 | Thomas | Mar. 21, 1916 |
| 1,236,546 | Cook | Aug. 14, 1917 |
| 2,359,418 | Hartman | Oct. 3, 1944 |
| 2,386,629 | North et al. | Oct. 9, 1945 |
| 2,395,273 | Hill et al. | Feb. 19, 1946 |

FOREIGN PATENTS

| Number | Country | Date |
|---|---|---|
| 109,671 | Sweden | Dec. 2, 1943 |
| 25,891 | Great Britain | of 1902 |
| 526,749 | Great Britain | Sept. 25, 1940 |
| 560,341 | Great Britain | Mar. 30, 1944 |